United States Patent
Aou et al.

(10) Patent No.: US 9,255,174 B2
(45) Date of Patent: Feb. 9, 2016

(54) USE OF POLY(BUTYLENE OXIDE) POLYOL TO IMPROVE DURABILITY OF MDI-POLYURETHANE FOAMS

(75) Inventors: Kaoru Aou, Lake Jackson, TX (US); Rogelio R. Gamboa, Brazoria, TX (US); Bernard E. Obi, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 87 days.

(21) Appl. No.: 13/817,749

(22) PCT Filed: Aug. 23, 2011

(86) PCT No.: PCT/US2011/048856
§ 371 (c)(1),
(2), (4) Date: Feb. 19, 2013

(87) PCT Pub. No.: WO2012/044414
PCT Pub. Date: Apr. 5, 2012

(65) Prior Publication Data
US 2013/0178548 A1 Jul. 11, 2013

Related U.S. Application Data

(60) Provisional application No. 61/387,892, filed on Sep. 29, 2010.

(51) Int. Cl.
*C08G 18/48* (2006.01)
*C08G 18/28* (2006.01)
*C08G 101/00* (2006.01)

(52) U.S. Cl.
CPC .......... *C08G 18/4854* (2013.01); *C08G 18/283* (2013.01); *C08G 18/48* (2013.01); *C08G 18/485* (2013.01); *C08G 18/4816* (2013.01); *C08G 18/4829* (2013.01); *C08G 2101/00* (2013.01); *C08G 2101/0008* (2013.01); *C08G 2101/0083* (2013.01)

(58) Field of Classification Search
CPC ............. C08G 18/485; C08G 18/4854; C08G 18/4816
USPC ......................................... 521/155, 170, 174
See application file for complete search history.

(56) References Cited

U.S. PATENT DOCUMENTS

| | | | |
|---|---|---|---|
| 4,596,665 A | 6/1986 | Gonzalez et al. | |
| 4,950,694 A | 8/1990 | Hager | |
| 5,137,934 A | 8/1992 | Williamson et al. | |
| 7,022,746 B2 * | 4/2006 | Lockwood et al. | 521/174 |
| 2004/0116594 A1 | 6/2004 | Bhattacharjee et al. | |
| 2011/0190408 A1 | 8/2011 | Casati et al. | |
| 2012/0028024 A1 | 2/2012 | Obi et al. | |

FOREIGN PATENT DOCUMENTS

| | | | |
|---|---|---|---|
| WO | 9606874 A1 | 3/1996 | |
| WO | WO-2010009205 A1 * | 1/2010 | |

OTHER PUBLICATIONS

PCT/US2011/048856, International Search Report and Written Opinion.
PCT/US2011/048856, International Preliminary Report on Patentability.

* cited by examiner

*Primary Examiner* — Melissa Rioja
(74) *Attorney, Agent, or Firm* — Whyte Hirschboeck Dudek S.C.

(57) ABSTRACT

Embodiments of the present invention relate to polyurethane foams having high air flow while maintaining viscoelastic properties. In one embodiment, a reaction system for preparation of a viscoelastic polyurethane foam is provided. The reaction system comprises (a) a polyisocyanate component and (b) an isocyanate reactive component. The isocyanate reactive component comprises (i) from 35 to 74% by weight of the isocyanate reactive component of one or more propylene oxide rich (PO-rich) polyols having a combined number average equivalent weight from 200 to 500, (ii) from 24 to 50% by weight of the isocyanate reactive component of one or more ethylene oxide rich (EO-rich) polyols having a combined number average equivalent weight from 200 to 2,800, and (iii) from 2 to 10% by weight of the isocyanate reactive component of one or more butylene oxide rich (BO-rich) polyethers having a number average equivalent weight of 2,000 or more.

14 Claims, No Drawings

USE OF POLY(BUTYLENE OXIDE) POLYOL TO IMPROVE DURABILITY OF MDI-POLYURETHANE FOAMS

BACKGROUND OF THE INVENTION

1. Field of the Invention

Embodiments of the present invention relate to polyurethane foams. More particularly, embodiments of the present invention relate to polyurethane foams having viscoelastic properties.

2. Description of the Related Art

Polyurethane foams are used in a wide variety of applications, ranging from cushioning (such as mattresses, pillows and seat cushions) to packaging to thermal insulation and for medical applications. Polyurethanes have the ability to be tailored to particular applications through the selection of the raw materials that are used to form the polymer.

One class of polyurethane foam is known as viscoelastic (VE) or "memory" foam. Viscoelastic foams exhibit a time-delayed and rate-dependent response to an applied stress. They have low resiliency and recover slowly when compressed. These properties are often associated with the glass transition temperature (Tg) of the polyurethane. Viscoelasticity is often manifested when the polymer has a Tg at or near the use temperature, which is room temperature for many applications.

Like most polyurethane foams, VE polyurethane foams are prepared by the reaction of a polyol component with a polyisocyanate, in the presence of a blowing agent. The blowing agent is usually water or a mixture of water and another material. VE formulations are often characterized by the selection of polyol component and the amount of water in the formulation. The predominant polyol used in these formulations has a functionality of about 3 hydroxyl groups/molecule and a molecular weight in the range of 400-1500. This polyol is primarily the principal determinant of the Tg of the polyurethane foam, although other factors such as water levels and isocyanate index also play significant roles.

Compression set is a measure of the permanent deformation of a foam after it has been held compressed under controlled time and temperature conditions. Compression set is generally used to correlate in-service loss of cushion thickness and changes in foam hardness. Lower compression set values are generally desirable for viscoelastic polyurethane foams.

Typically viscoelastic polyurethane foams have low air flow properties, generally less than about 1.0 standard cubic feet per minute (scfm) (0.47 liters/second) under conditions of room temperature (22° C.) and atmospheric pressure (1 atm), therefore promoting sweating when used as comfort foams (for instance, bedding, seating and other cushioning). Low air flow also leads to low heat and moisture transfer out of the foam resulting in (1) increased foam (bed) temperature and (2) moisture level. The consequence of higher temperature is higher resiliency and lowered viscoelastic character. Combined heat and moisture result in accelerated fatigue of the foam. In addition, if foam air flows are sufficiently low, foams can suffer from shrinkage during manufacturing.

It would be desirable to achieve improved compression set values than is generally now achieved while retaining viscoelastic properties of the foam. Furthermore, it would be desirable to have foams with improved compression set values while retaining properties such as air flow.

SUMMARY OF THE INVENTION

Embodiments of the present invention relate to polyurethane foams. More particularly, embodiments of the present invention relate to polyurethane foams having improved compression set values while maintaining viscoelastic properties. In one embodiment, a reaction system for preparation of a viscoelastic polyurethane foam is provided. The reaction system comprises (a) a polyisocyanate component and (b) an isocyanate reactive component. The isocyanate reactive component comprises (i) from 35 to 74% by weight of the isocyanate reactive component of one or more propylene oxide rich (PO-rich) polyols having a combined number average equivalent weight from 200 to 500, (ii) from 24 to 50% by weight of the isocyanate reactive component of one or more ethylene oxide rich (EO-rich) polyols having a combined number average equivalent weight from 200 to 2,800, and (iii) from 2 to 10% by weight of the isocyanate reactive component of one or more butylene oxide rich (BO-rich) polyethers having a number average equivalent weight of 2,000 or more. The minimum amount of EO-rich polyol to use in the formulation ranges from 24% by weight for equivalent weights less than 500 to 29% by weight for equivalent weights greater than 1,000.

In another embodiment, a method of preparing a viscoelastic foam is provided. The method comprises forming reaction components and combining the reaction components at conditions sufficient to form a viscoelastic polyurethane foam. The reaction components comprise an organic polyisocyanate, an isocyanate reactive component, water, and a catalyst component. The isocyanate reactive component comprises one or more PO-rich polyols having a combined number average equivalent weight from 200 to 500 at an amount from 35 to 74% by weight of the isocyanate reactive component, one or more EO-rich polyols having a combined number average equivalent weight from 200 to 2,800 at an amount from 24 to 50% by weight of the isocyanate reactive component, and one or more BO-rich polyethers having a number average equivalent weight of 2,000 or more at an amount from 2 to 10% by weight of the isocyanate reactive component.

DETAILED DESCRIPTION

Embodiments of the present invention relate to polyurethane foams. More particularly, embodiments of the present invention relate to polyurethane foams having improved compression set values while maintaining viscoelastic properties. In many commercial formulations of polyurethane foams, low compression set values have proved to be commonplace for MDI-based formulations which tend to be constrained to lower isocyanate index values than TDI-based formulations. The inventors have unexpectedly discovered that the use of poly(butylene oxide) in viscoelastic polyurethane foams results in a measurable and unexpected increase in compression set properties, which are predictive of many durability properties. Thus the embodiments described herein may be used to improve the compression set of MDI-based viscoelastic polyurethane foams, which often show poor compression set properties.

As used herein, the term "viscoelastic foam" is intended to designate those foams having a resilience of less than 25%, as measured according to ASTM D3574 Test H. Preferably the foam will have a resilience of less than 20%. In certain embodiments the foam will have a resilience of less than 15% or even less than 10%.

As used herein, the term "air flow" refers to the volume of air which passes through a 1.0 inch (2.54 cm) thick 2×inch×2 inch (5.08 cm) square section of foam at 125 Pa (0.018 psi) of pressure. Units are expressed in cubic decimeters per second (i.e. liters per second) and converted to standard cubic feet per minute. A representative commercial unit for measuring air flow is manufactured by TexTest AG of Zurich, Switzerland and identified as TexTest Fx3300. This measurement follows ASTM D 3574 Test G.

As used herein, the term "CFD 25%" refers to a compression force deflection measurement where a foam 4×4 inches in the lateral direction and 2 inches thick (10.16×10.16×5.08 cm) is compressed down in the thickness-axis to a compression strain of 25%, and held for one minute before the compression force deflection measurement is determined, i.e., the foam is compressed to 75%, of its original thickness, according to the procedures of ASTM D 3574 C and is measured in pounds force (lbf) or in Newtons (N). "CFD 65%" and "CFD 75%" similarly corresponds to a compression to 35% and 25% of the original foam thickness, respectively.

As used herein, number average equivalent weights are combined as follows: Combined Number Average Equivalent Weight=(grams of A+grams of B)/[(grams of A/equivalent weight of A)+(grams of B/equivalent weight of B)].

As used herein, the term "Compression Set @ 75%" stands for compression set test measured at the 75% compressive deformation level and parallel to the rise direction in the foam. This test is used herein to correlate in-service loss of cushion thickness and changes in foam hardness. The compression set is determined according to the procedures of ASTM D 3574-95, Test I, and is measured as percentage of original thickness of the sample. Similarly, "Compression Set @ 90%" refers to the same measurement as above (compression set), but this time measured at 90% compressive deformation level of the sample, parallel to the rise direction in the foam.

As used herein, the term "density" is used herein to refer to weight per unit volume of a foam. In the case of viscoelastic polyurethane foams the density is determined according to the procedures of ASTM D357401, Test A. Advantageously, the viscoelastic foam has a density of at least about 3, preferably at least about 3.5, more preferably at least about 4 and preferably at most about 8, more preferably at most about 6, most preferably at most about 5.5 pounds/ft$^3$ (48, 56, 64, 128, 96, 88 kg/m$^3$, respectively).

As used herein, the term "elongation %" as applied to a foam is used herein to refer to the linear extension which a sample of foam can attain before rupture. The foam is tested by the same method used to determine tensile strength, and the result is expressed as a percentage of the original length of the foam sample according to the procedures of ASTM D-3574, Test E.

As used herein, the term "functionality" particularly "polyol functionality" is used herein to refer to the number of active hydrogens on an initiator, used to prepare the polyol, that can react with an epoxide molecule (such as ethylene oxide or propylene oxide). This is also referred to as nominal functionality. For the purpose of polyol functionality, any primary/secondary amine or hydroxyl functionality will count once toward the nominal functionality value.

As used herein, the term "resiliency" is used to refer to the quality of a foam perceived as springiness. It is measured according to the procedures of ASTM D3574 Test H. This ball rebound test measures the height a dropped steel ball of known weight rebounds from the surface of the foam when dropped under specified conditions and expresses the result as a percentage of the original drop height. As measured according to the ASTM test, a cured VE foam exhibits a resiliency of advantageously at most about 20%, preferably at most about 10%.

As used herein, the term "support factor" refers to the ratio of 65% Compression (Indentation) Force Deflection (CFD) divided by 25% Compression Force Deflection.

As used herein, the term "tear strength" is used herein to refer to the maximum average force required to tear a foam sample which is pre-notched with a slit cut lengthwise into the foam sample. The test results are determined according to the procedures of ASTM D3574-F in pounds per linear inch (lbf/in) or in Newtons per meter (N/m).

As used herein, the term "tensile strength" as applied to a foam is used herein to refer to the maximum force which a dogbone shaped foam sample can bear while being extended under linear (uniaxial) extensional force. The stress is increased until the material reaches a break point at which time the load and extension at break are used to calculate the tensile strength and the elongation, all determined according to the procedures of ASTM D-3574, Test E and is measured in pounds per square inch (psi) or kilopascals (kPa).

The isocyanate-reactive components used in polyurethane production are generally those compounds having at least two hydroxyl groups. Those compounds are referred to herein as polyols. The polyols include those obtained by the alkoxylation of suitable starting molecules (initiators) with an alkylene oxide. The initiators can have from 2 to 8 reactive sites. Examples of initiator molecules having 2 to 4 reactive sites include water, ammonia, or polyhydric alcohols such as dihydric alcohols having a molecular weight from 62 to 399, especially the alkane polyols such as ethylene glycol, propylene glycol, hexamethylene diol, glycerol, trimethylol propane or trimethylol ethane, or low molecular weight alcohols containing ether groups such as diethylene glycol, triethylene glycol, dipropylene glycol, tripropylene glycol, butylene glycols or pentaerythritol. Examples of higher functional initiators include sorbitol, sucrose, glucose, fructose or other sugars, and the like. These polyols are conventional materials prepared by conventional methods. For polyols, when the term "triol" or "monol" is used, the functionality of the starting initiator (such as glycerin for triols and n-butanol for monols) is intended. Catalysis for this polymerization can be either anionic or cationic, with catalysts such as KOH, CsOH, boron trifluoride, or a double metal cyanide complex (DMC) catalyst such as zinc hexacyanocobaltate or quaternary phosphazenium compound. In the case of alkaline catalysts, these alkaline catalysts are preferably removed from the polyol at the end of production by a proper finishing step, such as coalescence, magnesium silicate separation or acid neutralization.

In one embodiment, a reaction system for preparation of a viscoelastic polyurethane foam is provided. The reaction system comprises (a) a polyisocyanate component and (b) an isocyanate reactive component. The reaction system may further comprise at least one of (c) one or more blowing agents, (d) one or more catalyst components, and (e) one or more surfactants. In certain embodiments, the reaction system further comprises additional additives.

Component (a) may comprise (i) from about 0 to 10% of a toluene diisocyanate (TDI) based organic polyisocyanate; and (ii) from about 90 to 100% of a methylene diphenyl diisocyanate (MDI) based component. In one embodiment, the TDI based component is a mixture of 2,4- and 2,6-toluene diisocyanate and the MDI based component is polymeric MDI. The polymeric MDI may have an approximate functionality of 2.3.

Component (a) may comprise one or more organic polyisocyanates having an average of 1.8 or more isocyanate groups per molecule. The isocyanate functionality is preferably from about 1.9 to 4, and more preferably from 1.9 to 3.5 and especially from 2.0 to 3.3.

The organic polyisocyanate may be a polymeric polyisocyanate, aromatic isocyanate, cycloaliphatic isocyanate, or aliphatic isocyanate. Exemplary polyisocyanates include m-phenylene diisocyanate, tolulene-2,4-diisocyanate, tolulene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, a polymethylene polyphenylisocyanate (PMDI), toluene-2,4,6-triisocyanate and 4,4'-dimethyldiphenyl-methane-2,2',5,5'-tetraisocyanate. Preferably the polyisocyanate is diphenylmethane-4,4'-diisocyanate, diphenyl-methane-2,4'-diisocyanate, or mixtures thereof. Diphenylmethane-4,4'-diisocyanate, diphenylmethane-2,4'-diisocyanate and mixtures thereof are generically referred to as MDI, and all can be used. Toluene-2,4-diisocyanate, toluene-2,6-diisocyanate and mixtures thereof are generically referred to as TDI, and all can be used.

Preferred MDI based polyisocyanates include MDI and derivatives of MDI such as biuret modified "liquid" MDI products and polymeric MDI. Preferred polyisocyanates are the so-called polymeric MDI products, which are a mixture of polymethylene polyphenylene polyisocyanates in monomeric MDI. In one embodiment, the polymeric MDI comprises 70% by weight or more of the total isocyanate. Especially suitable polymeric MDI products have a free MDI content of from 5 to 50% by weight, more preferably 10 to 40% by weight. Such polymeric MDI products are available from The Dow Chemical Company under the trade names PAPI® and VORANATE®.

An especially preferred polyisocyanate is a polymeric MDI product having an average isocyanate functionality of from 2.3 to 3.3 isocyanate groups/molecule and an isocyanate equivalent weight from 130 to 170. Suitable commercially available products of that type include PAPI™ PB-219, PAPI™ 27, PAPI™ 94, VORANATE™ M229, VORANATE™ 220, VORANATE™ 290, VORANATE™ M595 and VORANATE™ M600, all of which are available from The Dow Chemical Company.

A polyisocyanate of particular interest is a mixture of 2,4- and 2,6-toluene diisocyanate containing at about 80% by weight of the 2,4-isomers. Another polyisocyanate of particular interest is a mixture of 2,4- and 2,6-toluene diisocyanate containing at least 60% by weight of the 2,4-isomer. Suitable commercially available products of that type include VORANATE™ T-80.

The amount of polyisocyanate that is typically used is sufficient to provide an isocyanate index of from 65 to 110. In another the embodiment the index is from 70 to 100 and in a further embodiment from 80 to 90.

Component (b) is an isocyanate reactive component comprising (i) from 35 to 74% by weight of the isocyanate reactive component of one or more PO-rich polyols having a combined number average equivalent weight from 200 to 500, (ii) from 24 to 50% by weight of the isocyanate reactive component of one or more EO-rich polyols having a combined number average equivalent weight from 200 to 2,000, and (iii) from 2 to 10% by weight of the isocyanate reactive component of one or more BO-rich polyethers having a number average equivalent weight of 2,000 or more. The isocyanate reactive component (b) may further comprise (iv) from 10 to 25% by weight of the isocyanate reactive component of one or more ethylene oxide-propylene oxide monols.

The one or more PO-rich polyols ((b)(i)) may comprise at least 35 wt. %, 40 wt. %, 45 wt. %, 50 wt. %, 55 wt. %, 60 wt. %, 65 wt. %, or 70 wt. % of the total isocyanate reactive component (b). The one or more PO-rich polyols ((b)(i)) may comprise up to 40 wt. %, 45 wt. %, 50 wt. %, 55 wt. %, 60 wt. %, 65 wt. %, 70 wt. %, or up to 75 wt % of the total isocyanate reactive component (b). The one or more PO-rich polyols ((b)(i)) may comprise from 45% to 70% by weight or from about 50% to 60% by weight of the total isocyanate reactive component (b).

The one or more PO-rich polyols ((b)(i)) may have a combined number average equivalent weight from 200 to 500 and preferably from 220-450. The one or more PO-rich polyols ((b)(i)) may have a functionality from 2.4 to 4.0.

In certain embodiments, the isocyanate reactive component (b) comprises multiple PO-rich polyol components for example, one or more low equivalent weight PO-rich polyols ((b)(i)(A)) having a combined number average equivalent weight from 200 to 500 and one or more high equivalent weight PO-rich polyols ((b)(i)(B)) having a combined number average equivalent weight from 800 to 2,000. The polyol components may independently contain weight percents derived from PO as described herein.

In certain embodiments when both the low equivalent weight polyol ((b)(i)(A)) and the high equivalent weight polyol ((b)(i)(B)) are present, the one or more low equivalent weight PO-rich polyols ((b)(i)(A)) may comprise at least 30 wt. %, 35 wt. %, 40 wt. %, 45 wt. %, 50 wt. %, or 55 wt. % of the total isocyanate reactive component (b). The one or more low equivalent weight PO-rich polyols ((b)(i)(A)) may comprise up to 35 wt. %, 40 wt. %, 45 wt. %, 50 wt. %, 55 wt. %, or up to 60 wt % of the total isocyanate reactive component (b). The one or more low equivalent weight PO-rich polyols ((b)(i)(A)) may comprise from 30% to 60% by weight or from about 35% to 50% by weight of the total isocyanate reactive component (b).

The one or more low equivalent weight PO-rich polyols ((b)(i)(A)) may have a combined number average equivalent weight from 200 to 340. The one or more low equivalent weight PO-rich polyols ((b)(i)(A)) may have a functionality between 2 and 4. The one or more low equivalent weight PO-rich polyols ((b)(i)(A)) may have a functionality between 2.5 and 3. The one or more low equivalent weight PO-rich polyols ((b)(i)(A)) may have a polyoxypropylene content of at least 70 wt. %, 75 wt %, 80 wt. %, 85 wt. %, 90 wt. %, or 95 wt. % of the total mass of the low equivalent weight PO-rich polyol. The one or more low equivalent weight PO-rich polyols ((b)(i)(A)) may have a polyoxypropylene content of up to 75 wt. %, 80 wt. %, 85 wt. %, 90 wt. %, 95 wt. % or 100 wt. % of the total mass of the low equivalent weight PO-rich polyol. The one or more low equivalent weight PO-rich polyols ((b)(i)(A)) may have some amount of primary hydroxyl content. The one or more low equivalent weight PO-rich polyols ((b)(i)(A)) may have a primary hydroxyl content of 20% or greater of the total hydroxyl content of the low equivalent weight PO-rich polyol. The one or more low equivalent weight PO-rich polyols ((b)(i)(A)) may have a primary hydroxyl content of 30% or greater of the total hydroxyl content of the low equivalent weight PO-rich polyol.

The one or more high equivalent weight PO-rich polyols ((b)(i)(B)) may comprise at least 5 wt. %, 10 wt %, 15 wt. %, or 20 wt. % of the total isocyanate reactive component (b). The one or more high equivalent weight PO-rich polyols ((b)(i)(B)) may comprise up to at least 10 wt. %, 15 wt. %, 20 wt. % or up to 25 wt. % of the total isocyanate reactive component (b). The one or more high equivalent weight PO-rich polyols ((b)(i)(B)) may comprise from 5% to 25% by weight or from about 10% to 15% by weight of the total isocyanate reactive component (b).

The one or more high equivalent weight PO-rich polyols ((b)(i)(B)) may have a combined number average equivalent weight from 900 to 1,200. The one or more high equivalent weight PO-rich polyols ((b)(i)(B)) may have a functionality between 2 and 4. The one or more high equivalent weight PO-rich polyols ((b)(i)(B)) may have a functionality between 2.2 and 3. The one or more high equivalent weight PO-rich polyols ((b)(i)(B)) may have a polyoxypropylene content of at least 70 wt. %, 75 wt. %, 80 wt. %, 85 wt. %, 90 wt. %, or 95 wt. % of the total mass of the low equivalent weight PO-rich polyol. The one or more high equivalent weight PO-rich polyols ((b)(i)(B)) may have a polyoxypropylene content of up to 75 wt. %, 80 wt. %, 85 wt. %, 90 wt. %, 95 wt. % or 100 wt. % of the total mass of the high equivalent weight PO-rich polyol. The one or more high equivalent weight PO-rich polyols ((b)(i)(B)) may have a polyoxyethylene content at least 5 wt. %, 8 wt. %, 10 wt. %, or 15 wt. % of the total mass of the high equivalent weight PO-rich polyol. The one or more high equivalent weight PO-rich polyols ((b)(i)(B)) may have a polyoxyethylene content of up to 8 wt. %, 10 wt. %, 15 wt. %, or 20 wt. % of the total mass of the high equivalent weight PO-rich polyol. The one or more high equivalent weight PO-rich polyols ((b)(i)(B)) may comprise catalytically active polyols such as VORANOL™ VORACTIV™ available from The DOW CHEMICAL COMPANY. The one or more high equivalent weight PO-rich polyols ((b)(i)(B)) may comprise co-polymer polyols, for example, acrylonitrile grafted polyether polyols, such as VORALUX™ HL-431 available from The DOW CHEMICAL COMPANY.

In certain embodiments, the one or more EO-rich polyols ((b)(ii)) may comprise at least 24 wt. %, 29 wt. %, 30 wt. %, 35 wt. %, 40 wt. %, or 45 wt. % of the total isocyanate reactive component (b). In certain embodiments, the one or more EO-rich polyols ((b)(ii)) may comprise up to 30 wt. %, 35 wt. %, 40 wt. %, 45 wt. %, or 50 wt. %. The one or more EO-rich polyols ((b)(ii)) may comprise from 30 wt % to 45 wt % by weight of the total isocyanate reactive component (b).

In certain embodiments, the one or more EO-rich polyols ((b)(ii)) have a combined number average equivalent weight from 200 to 2,800. The minimum amount of EO-rich polyol to use in the formulation ranges from 24 wt. % for equivalent weights less than 500 to 29 wt. % for equivalent weights greater than 1,000. For equivalent weights from 500 to 1,000, the amount may be calculated using the formula: Amount of EO-rich polyols in weight percent=[0.0041×(combined number average equivalent weights)+22.6].

The one or more EO-rich polyols ((b)(ii)) may be a low equivalent weight polyol having a combined number average equivalent weight from 200 to 500. The one or more EO-rich polyols ((b)(ii)) may be a high equivalent weight polyol having a combined number average equivalent weight from 1,000 to 2,800. In another embodiment, the one or more EO-rich polyols ((b)(ii)) may have an equivalent weight of greater than 500 to less than 1,000 or a blend of polyols providing an average equivalent weight of greater than 500 to less than 1,000. The one or more EO-rich polyols ((b)(ii)) may have a functionality between 2.8 and 8. The one or more low equivalent weight EO-rich polyols ((b)(ii)) may have a functionality between 2.8 and 6. The one or more high equivalent weight EO-rich polyols ((b)(ii)) may have a functionality between 5.5 and 7. The one or more EO-rich polyols ((b)(ii)) may have a polyoxyethylene content of at least 70 wt. %, 75 wt. %, 80 wt. %, 85 wt. %, 90 wt. %, or 95 wt. % of the total mass of the one or more EO-rich polyols. The one or more EO-rich polyols ((b)(ii)) may have a polyoxyethylene content of up to 75 wt. %, 80 wt. %, 85 wt. %, 90 wt. %, 95 wt. % or 100 wt. % of the total mass of the one or more EO-rich polyols. The one or more EO-rich polyols ((b)(ii)) may have a polyoxypropylene content of at least 5 wt. %, 10 wt. %, 15 wt. %, 20 wt. %, or 25 wt. % of the total mass of the one or more EO-rich polyols. The one or more EO-rich polyols ((b)(i)(B)) may have a polyoxypropylene content of up to 10 wt. %, 15 wt. %, 20 wt. %, 25 wt. % or 30 wt. % of the total mass of the one or more EO-rich polyols.

In certain embodiments, the one or more BO-rich polyethers ((b)(iii)) may comprise at least 2 wt. %, 3 wt. %, 5 wt. %, or 8 wt. % of the total isocyanate reactive component (b). In certain embodiments, the one or more BO-rich polyethers ((b)(iii)) may comprise up to at least 3 wt. %, 5 wt. %, 8 wt. %, or up to 10 wt. % of the total isocyanate reactive component (b). In certain embodiments, the one or more butylene oxide (BO) rich polyethers ((b)(iii)) may comprise from 2% to 10% by weight or from about 3% to 10% by weight of the total isocyanate reactive component (b).

The one or more BO-rich polyethers ((b)(iii)) may have a combined number average equivalent weight of 2,000 or greater. The one or more BO-rich polyethers ((b)(iii)) may have a combined number average equivalent weight of 3,000 or greater. The one or more BO-rich polyethers ((b)(iii)) may have a combined number average equivalent weight of 4,000 or greater. The one or more BO-rich polyethers ((b)(iii)) may have a functionality from 1 to 3. The one or more BO-rich polyethers ((b)(iii)) may have a polyoxybutylene content of at least 70 wt. %, 75 wt. %, 80 wt. %, 85 wt. %, 90 wt. %, or 95 wt. % of the total mass of the one or more BO-rich polyethers. The one or more BO-rich polyethers ((b)(iii)) may have a polyoxybutylene content of up to 75 wt. %, 80 wt. %, 85 wt. %, 90 wt. %, 95 wt. % or 100 wt. % of the total mass of the one or more BO-rich polyethers. In certain embodiments, the BO rich polyether can be enriched with primary hydroxyls by EO-capping. It should also be understood that the embodiments described herein are not limited to monofunctional BO-rich polyethers.

In certain embodiments, the one or more propylene oxide-co-ethylene oxide monols ((b)(iv)) may comprise at least 10 wt %, 15 wt %, or 20 wt % of the total isocyanate reactive component (b). The one or more propylene oxide-co-ethylene oxide monols ((b)(iv)) may comprise up to at least 15 wt %, 20 wt %, 21 wt. % or up to 25 wt % of the total isocyanate reactive component (b). The one or more propylene oxide-co-ethylene oxide monols ((b)(iv)) may comprise from 10% to 25% by weight or from about 15% to 21% by weight of the total isocyanate reactive component (b).

The one or more propylene oxide-co-ethylene oxide monols ((b)(iv)) may have an equivalent weight from 300 to 800. The one or more propylene oxide-co-ethylene oxide monols ((b)(iv)) may have an equivalent weight from 400 to 600. The one or more propylene oxide-co-ethylene oxide monols ((b)(iv)) may have a functionality between 1 and 2. The one or more propylene oxide-co-ethylene oxide monols ((b)(iv)) may have a polyoxyethylene content from 30-70% of the total mass of the copolymer. The one or more propylene oxide-co-ethylene oxide monols ((b)(iv)) may have a polyoxyethylene content from 40-60% of the total mass of the copolymer. In certain embodiments, the one or more propylene oxide-co-ethylene oxide monols ((b)(iv)) are selected from random block copolymers (RBC) and block copolymers. In certain embodiments, the one or more propylene oxide-co-ethylene oxide monols ((b)(iv)) contain equal amounts by weight of oxyethylene and oxypropylene groups.

In certain embodiments, the reaction system further comprises (c) water. The water content may be from 1% to 5% by weight of the reaction system. The water content may be from 1% to 2% by weight of the total reaction system.

In certain embodiments, the reaction system further comprises (d) one or more catalysts. Catalysts are typically used in small amounts, for example, each catalyst being employed from about 0.0015 to about 5% by weight of the total reactive system. The amount depends on the catalyst or mixture of catalysts, the desired balance of the gelling and blowing reactions for specific equipment, the reactivity of the polyols and isocyanate as well as other factors familiar to those skilled in the art.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate and the like, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino) alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts. Examples of tertiary amine catalysts include: trimethylamine, triethylamine, N-methylmorpholine, N-ethylmorpholine, N, N-dimethylbenzylamine, N,N-dimethylethanolamine, N,N-dimethylaminoethyl, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of commercially available amine catalysts include NIAX™ A1 and NIAX™ A99 (bis(dimethylaminoethyl)ether in propylene glycol available from Momentive Performance Materials), NIAX™ B9 (N,N-dimethylpiperazine and N—N-dimethylhexadecylamine in a polyalkylene oxide polyol, available from Momentive Performance Materials), DABCO® 8264 (a mixture of bis(dimethylaminoethyl)ether, triethylenediamine and dimethylhydroxyethyl amine in dipropylene glycol, available from Air Products and Chemicals), DABCO® BL-11 (a mixture of bis(N,N dimethylaminoethyl) ether in dipropylene glycol, available from Air Products and Chemicals) and DABCO 33LV® (triethylene diamine in dipropylene glycol, available from Air Products and Chemicals), NIAX™ A-400 (a proprietary tertiary amine/carboxylic salt and bis(2-dimethylaminoethy)ether in water and a proprietary hydroxyl compound, available from Momentive Performance Materials); NIAX™ A-300 (a proprietary tertiary amine/carboxylic salt and triethylenediamine in water, available from Momentive Performance Materials); POLYCAT® 58 (a proprietary amine catalyst available from Air Products and Chemicals), POLYCAT® 5 (pentamethyl diethylene triamine, available from Air Products and Chemicals) and POLYCAT® 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts are generally used in conjunction with one or more tertiary amine catalysts, if used at all. Commercially available organotin catalysts of interest include KOSMOS® 29 (stannous octoate from Evonik AG), DABCO® T-9 and T-95 catalysts (both stannous octoate compositions available from Air Products and Chemicals).

In certain embodiments, the reaction system further comprises (e) one or more surfactants to help stabilize the foam as it expands and cures. Surfactants are typically used in small amounts, for example, each catalyst being employed from about 0.0015 to about 5% by weight of the total reaction system. In certain embodiment, the surfactant may be present from about 0.1% to about 1% by weight of the total reaction system. The amount depends on the surfactants or mixture of surfactants, as well as other factors familiar to those skilled in the art.

Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids may also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB® (trademark of Evonik AG) B-8462, B-8404 and B-8871, and DC-198 and DC-5043 surfactants, available from Dow Corning, and NIAX™ L-618 and NIAX™ L-627 surfactant from Momentive Performance Materials.

In a further embodiment, to improve processing and to permit the use of higher isocyanate indices, additives such as those described in publication WO 20008/021034, the disclosure of which is incorporated herein by reference, may be added to the reaction mixture. Such additives include 1) alkali metal or transition metal salts of carboxylic acids; 2) 1,3,5-tris alkyl- or 1,3,5-tris(N,N-dialkyl amino alkyl)-hexahydro-s-triazine compounds; and 3) carboxylate salts of quaternary ammonium compounds. When used, such additives are generally used in an amount from about 0.01 to 1 part per 100 total polyol. The component e) additive is generally dissolved in at least one other component of the reaction mixture. It is generally not preferred to dissolve it in the polyisocyanate.

Various additional components may be included in the viscoelastic foam formulation. These include, for example, chain extenders, crosslinkers, fillers, plasticizers, smoke suppressants, fragrances, reinforcements, dyes, colorants, pigments, preservatives, odor masks, physical blowing agents, chemical blowing agents, flame retardants, internal mold release agents, biocides, antioxidants, UV stabilizers, antistatic agents, thixotropic agents, adhesion promoters, cell openers, and combination of these.

The foamable composition may contain a chain extender or crosslinker. When these materials used, they are typically used in small quantities such as up to 10 parts, especially up to 2 parts, by weight per 100 parts by weight of the total reactive system. A chain extender is a material having two isocyanate-reactive groups/molecule, whereas a crosslinker contains on average greater than two isocyanate-reactive groups/molecule. In either case, the equivalent weight per isocyanate-reactive group can range from about 30 to less than 100, and is generally from 30 to 75. The isocyanate-reactive groups are preferably aliphatic alcohol, primary amine or secondary amine groups, with aliphatic alcohol groups being particularly preferred. Examples of chain extenders and crosslinkers include alkylene glycols such as ethylene glycol, 1,2- or 1,3-propylene glycol, 1,4-butanediol, 1,6-hexanediol, and the like; glycol ethers such as diethylene glycol.

One or more fillers may also be present in the viscoelastic foam formulation. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include kaolin, montmorillonite, calcium carbonate, mica, wollastonite, talc, high-melting thermoplastics, glass, fly ash, carbon black titanium dioxide, iron oxide, chromium oxide, azo/diazo dyes, phthalocyanines, dioxazines and the like. The filler may impart thixotropic properties to the foamable polyurethane composition. Fumed silica is an example of such a filler.

When used, fillers advantageously constitute from about 0.5 to about 30%, especially about 0.5 to about 10%, by weight of the reaction system.

Reactive particles may also be included in the reaction system to modify the properties of the viscoelastic foam. Such reactive systems include copolymer polyols such as those containing styrene/acrylonitrile (SAN), polyharnstoff dispersion (PHD) polyols and polyisocyanate polyaddition products (PIPA), for instance as taught in Chemistry and Technology of Polyols for Polyurethanes, Rapra Technology Limited (2005) pp 185-227.

Although no additional blowing agent (other than the water) is generally used in the foamable polyurethane composition, it is within the scope of the embodiments described herein to include an additional physical or chemical blowing agent. Among the physical blowing agents are liquid $CO_2$, supercritical $CO_2$ and various hydrocarbons, fluorocarbons, hydrofluorocarbons, chlorocarbons (such as methylene chloride), chlorofluorocarbons and hydrochlorofluorocarbons. Chemical blowing agents are materials that decompose or react (other than with isocyanate groups) at elevated temperatures to produce carbon dioxide and/or nitrogen.

The VE foam can be prepared in a so-called slabstock process, or by various molding processes. In a slabstock process, the components are mixed and poured into a trough or other region where the formulation reacts, expands freely in at least one direction, and cures. Slabstock processes are generally operated continuously at commercial scales.

In a slabstock process, the various components are introduced individually or in various subcombinations into a mixing head, where they are mixed and dispensed. Component temperatures are generally in the range of from 15 to 35° C. prior to mixing. The dispensed mixture typically expands and cures without applied heat. In the slabstock process, the reacting mixture expands freely or under minimal restraint (such as may be applied due to the weight of a cover sheet or film).

It is also possible to produce the viscoelastic foam in a molding process, by introducing the reaction mixture into a closed mold where it expands and cures. Often times, the mold itself is pre-heated to a temperature above ambient conditions. Such pre-heating of the mold can lead to faster cycle time.

Viscoelastic foam made in accordance with the embodiments described herein are useful in a variety of packaging and cushioning applications, such as mattresses, including mattress toppers, pillows, packaging, bumper pads, sport and medical equipment, helmet liners, pilot seats, earplugs, and various noise and vibration dampening applications. The noise and vibration dampening applications are of particular importance for the transportation industry, such as in automotive applications.

The following examples are provided to illustrate embodiments of the invention, but are not intended to limit the scope thereof. All parts and percentages are by weight unless otherwise indicated.

A description of the raw materials used in the examples is as follows.

Polyol A is a glycerin initiated, trifunctional, propylene-oxide (PO) based polyol having an equivalent weight of 336 with a hydroxyl number of 167 commercially available from The Dow Chemical Company under the trade designation VORANOL® 3150.

Polyol B is a glycerin initiated, trifunctional, polyoxyethylene-polyoxypropylene mixed feed polyol (8 wt. % ED) having an equivalent weight of approximately 994 with a hydroxyl number of 56 available from The Dow Chemical Company under the trade designation VORANOL® 3010 polyol.

Polyol C is a sucrose/glycerin initiated, 6.9 functional random copolymer of ethylene oxide and propylene oxide with greater than 70% ethylene oxide having an equivalent weight of approximately 1800 with a hydroxyl number of 31, commercially available from The Dow Chemical Company under the trade designation VORANOL® 4053 polyol.

Polyol D is a glycerin initiated, trifunctional, 236 equivalent weight all propylene oxide polyether polyol with a hydroxyl number of 238 commercially available from the Dow Chemical Company under the trade designation VORANOL® 2070 polyol.

Polyol E is a glycerin initiated, trifunctional EO based polyol with an equivalent weight of 338.

Polyol F is a poly propylene oxide-co-ethylene oxide monol with an equivalent weight of approximately 520, commercially available from The Dow Chemical Company under the trade designation UCON™ 50-HB-100.

Monol A is a butanol initiated, monofunctional butylene oxide (BO) based monol with an equivalent weight of 4,400.

Monol B is a butanol initiated, monofunctional BO based monol with 11% ethylene oxide capping and an equivalent weight of 4,400.

Surfactant A is a silicone surfactant used for viscoelastic MDI foams, composed of polysiloxane-polyoxyalkylene, commercially available from Momentive Performance Materials as NIAX™ L-618 surfactant.

Catalyst A is a 70/30 mixture of bis(N,N dimethylaminoethyl) ether in dipropylene glycol, commercially supplied as DABCO® BL-11 catalyst available from Air Products and Chemicals, Inc.

Catalyst B is a 33/67 mixture of triethylene diamine in dipropylene glycol, commercially available from Air Products and Chemicals as DABCO 33LV®.

Catalyst C is a stannous octoate catalyst, commercially available from Air Products and Chemicals as DABCO™ T-9.

Isocyanate A is a 80/20 mixture of 2,4- and 2,6-toluene diisocyanate, commercially available as VORANATE™ T-80 from THE DOW CHEMICAL COMPANY.

Isocyanate B is a polymeric MDI with an approximate functionality of 2.3, commercially available as PAPI™ from THE DOW CHEMICAL COMPANY.

Isocyanate C is a polymeric MDI with an approximate functionality of 2.2, commercially available as PAPI™ PB-219 from THE DOW CHEMICAL COMPANY.

Test Methods

Unless otherwise specified, the foam properties are measured by ASTM D3574.

The samples in this study were made through box foaming using a 38 cm×38 cm×24 cm wooden box lined with clear plastic film lining. A high shear 16-pin (4 pins each in four radial directions) mixer at high rotation speed was used. The pin mixer head was designed such that the ends of the pins are 1 cm clear of the wall of the 1-gallon cylindrical mixing cup. The poloyl components were directly weighed out in the 1-gallon cylindrical mixing cup. Other additives were weighed out in a tared syringe and, except for the tin catalyst, added into the 1-gallon cup. The isocyanate components were weighed into a tripour without further agitation. The components in the formulation with the exception of the tin catalyst and isocyanate were mixed first for 15 seconds at 2,400 rpm. Then the stannous octoate catalyst was added and immediately mixed for another 15 seconds (2,400 rpm). Finally the isocyanate was added to the mixture and immediately mixed for another 3 seconds (3,000 rpm). The entire mixture was poured into the box lined with plastic film. The blow off time was measured from the moment the final mixing step (the step with the addition of isocyanate) starts. Once foaming was complete, the foam was further allowed to cure for one week. Foam sample walls were discarded and the remaining samples were characterized for mechanical and chemical analysis. The formulations used for producing polyurethane foam are provided in Table 1, Table 3, and Table 4.

Foam samples were characterized according to ASTM D 3574. The mechanical properties of the produced foams are provided in Table 2, Table 3, and Table 4.

Table 1 describes the formulations explored for two series of samples, Series A (A00, A05, A10) and Series B (B00, B05, B10) and Table 2 shows the mechanical properties observed for such formulations. The results shown in Table 2 demonstrate that use of butylene oxide in sufficient amounts improves the compression set of the foam produced. Comparative examples are labeled as A00 and B00 both of which do not contain a butylene oxide based monol (Mono) A or Monol B). A05 is also a comparative example. Formulations of the embodiments described herein are labeled as A10, B05, and B10. Since the formulations of Series A did not keep the relative ratios of the polyols constant, another series, Series B, was tested. As shown in Table 1 for Series B, Polyol A and Polyol B are present at a mass ratio of about 45 to 9 and Polyol C is fixed at about 36 parts per hundred of total polyol. In Table 2, improvement is observed for the 90% compression set property for A10, B05, and B10.

TABLE 1

Formulations.

| Components | A00 | A05 | A10 | B00 | B05 | B10 |
|---|---|---|---|---|---|---|
| Polyol A | 50 | 55 | 45 | 53.3 | 49.2 | 45 |
| Polyol B | 9 | 12 | 9 | 10.7 | 9.8 | 9 |
| Polyol C | 41 | 28 | 36 | 36 | 36 | 36 |
| Monol A | 0 | 5 | 10 | 0 | 5 | 10 |
| Water | 1.73 | 1.73 | 1.73 | 1.73 | 1.73 | 1.73 |
| Surfactant A | 0.6 | 0.6 | 0.6 | 0.6 | 0.6 | 0.6 |
| Catalyst A | 0.22 | 0.22 | 0.22 | 0.22 | 0.22 | 0.22 |
| Catalyst B | 0.15 | 0.15 | 0.15 | 0.15 | 0.15 | 0.15 |
| Catalyst C | 0.016 | 0.016 | 0.016 | 0.016 | 0.016 | 0.016 |
| Total | 102.7 | 102.7 | 102.7 | 102.7 | 102.7 | 102.7 |

TABLE 1-continued

Formulations.

| Components | A00 | A05 | A10 | B00 | B05 | B10 |
|---|---|---|---|---|---|---|
| Isocyanate A | 2.6 | 2.7 | 2.5 | 2.7 | 2.6 | 2.5 |
| Isocyanate B | 35.7 | 36.9 | 34.3 | 36.5 | 35.4 | 34.2 |
| Total Mass | 141.0 | 142.2 | 139.5 | 141.9 | 140.7 | 139.5 |
| Isocyanate Index | 80 | 80 | 80 | 80 | 80 | 80 |

TABLE 2

Properties.

| Properties | A00 | A05 | A10 | B00 | B05 | B10 |
|---|---|---|---|---|---|---|
| Density (kg/m$^3$) | 48 | 46 | 50 | 48 | 52 | 52 |
| CFD 25% (kPa) | 0.72 | 0.29 | 0.73 | 0.80 | 0.82 | 0.77 |
| CFD 65% (kPa) | 1.67 | 0.82 | 1.69 | 1.76 | 1.80 | 1.70 |
| CFD 75% (kPa) | 2.87 | 1.51 | 2.90 | 2.99 | 3.03 | 2.88 |
| Support Factor | 2.30 | 2.86 | 2.32 | 2.21 | 2.20 | 2.21 |
| Resiliency(%) | 16 | 8 | 15 | 15 | 15 | 16 |
| Air Flow (L/sec) | 3.1 | 3.1 | 3.5 | 2.6 | 2.6 | 3.6 |
| Tear Strength (N/m) | 119 | 126 | 124 | 126 | 119 | 124 |
| Ten. Str. (kPa) | 38 | 29 | 41 | 44 | 39 | 39 |
| % Elongation | 105 | 115 | 94 | 99 | 83 | 78 |
| 75% CS (%) | 2 | 68 | 2 | 2 | 2 | 3 |
| 90% CS (%) | 84 | 87 | 2 | 67 | 3 | 4 |

Table 3 shows the formulations and 90% Compression Set results for examples #1-12. Comparative examples which do not contain a butylene oxide monol (Monol A or Monol B) are labeled as #1, #8, and #10. Table 3 shows formulations that use Polyol C (the high EW "cell opener" polyol) as the EO-rich polyol. Table 4 shows the formulations and 90% Compression Set results for examples #13-20. Comparative examples which do not contain a butylene oxide monol are labeled as #13, #14, and #16. Table 4 shows formulations that use Polyol E (the low equivalent weight all EO triol).

The results of Table 3 demonstrate that reasonable 90% compression set (15% or lower) can be obtained for a high equivalent weight EO-rich polyol (EW=1795) in amounts of 29 parts per hundred polyol of total polyol (pphp) to 50 pphp, and a BO-rich polyether monol of 2 pphp and above. More preferred is the range where the EO-rich polyol is present from about 32 pphp to about 40 pphp and the BO-rich monol is present at 2 pphp and above.

The results of Table 4 demonstrate that a reasonable 90% compression set can be obtained for a low equivalent weight EO-rich polyol (EW=338) in amounts of 20 pphp and above and a BO-rich polyether monol of 0.5 pphp and above. More

TABLE 3

Formulations & Properties.

| Components | #1 | #2 | #3 | #4 | #5 | #6 | #7 | #8 | #9 | #10 | #11 | #12 |
|---|---|---|---|---|---|---|---|---|---|---|---|---|
| Polyol A | 50 | 55 | 45 | 53 | 49.3 | 45 | 49.17 | 53.33 | | 60 | 55.71 | 51.43 |
| Polyol B | 9 | 12 | 9 | 12 | 10.7 | 9 | 9.83 | 10.67 | 9.6 | 10 | 9.29 | 8.57 |
| Polyol C | 41 | 28 | 36 | 25 | 37.5 | 36 | 36 | 36 | 36 | 30 | 30 | 30 |
| Monol A | 0 | 5 | 10 | 10 | 2.5 | 10 | 5 | 0 | 1 | 0 | 5 | 10 |
| Polyol D | | | | | | | | | 32.4 | | | |
| Polyol F | | | | | | | | | 21 | | | |
| Water | 1.73 | 1.73 | 1.73 | 1.73 | 1.73 | 1.73 | 1.73 | 1.73 | 1.73 | 1.73 | 1.73 | 1.73 |
| Surfactant A | 0.6 | 0.6 | 1.5 | 0.6 | 0.6 | 0.6 | 0.6 | 0.6 | 0.6 | 0.6 | 0.6 | 0.6 |
| Catalyst A | 0.22 | 0.22 | 0.22 | 0.22 | 0.22 | 0.22 | 0.22 | 0.22 | 0.22 | 0.22 | 0.22 | 0.22 |
| Catalyst B | 0.15 | 0.15 | 0.15 | 0.15 | 0.15 | 0.15 | 0.15 | 0.15 | 0.15 | 0.15 | 0.15 | 0.15 |
| Catalyst C | 0.016 | 0.016 | 0 | 0.016 | 0.016 | 0.016 | 0.016 | 0.016 | 0.016 | 0.016 | 0.016 | 0.016 |
| Polyol side total | 102.72 | 102.72 | 103.60 | 102.72 | 102.72 | 102.72 | 102.72 | 102.72 | 102.72 | 102.72 | 102.72 | 102.72 |
| Nominal index | 80 | 80 | 80 | 80 | 80 | 80 | 80 | 80 | 80 | 80 | 80 | 80 |
| Isocyanate A | 2.60 | 2.68 | 2.49 | 2.64 | 2.59 | 2.49 | 2.58 | 2.66 | 0.00 | 0.00 | 0.00 | 0.00 |
| Isocyanate B | 35.71 | 36.85 | 34.26 | 36.24 | 35.53 | 34.24 | 35.39 | 36.54 | 42.53 | | | |
| Isocyanate C | | | | | | | | | | 36.33 | 36.33 | 36.33 |
| Total Mass | 141.03 | 142.25 | 140.35 | 141.60 | 140.84 | 139.45 | 140.68 | 141.91 | 145.24 | 139.05 | 139.05 | 139.05 |
| 90% Compression Set | 84 | 87 | 2 | 86 | 2 | 4 | 3 | 67 | 3 | 11 | 11 | 89 |

TABLE 4

Formulations & Properties..

| Components | #13 | #14 | #15 | #16 | #17 | #18 | #19 | #20 |
|---|---|---|---|---|---|---|---|---|
| Polyol B | 14.1 | 14.1 | 10 | 13 | 11.1 | 11.1 | 9.1 | 9.1 |
| Monol B | 0 | 0 | 3 | 0 | 3 | 3 | 10 | 10 |
| Polyol D | 45.9 | 45.9 | 47 | 45 | 36.9 | 36.9 | 33.9 | 33.9 |
| Polyol E | 25 | 25 | 25 | 25 | 28 | 28 | 28 | 28 |
| Polyol F | 15 | 15 | 15 | 17 | 21 | 21 | 19 | 19 |
| Water | 1.73 | 1.73 | 1.73 | 1.73 | 1.73 | 1.73 | 1.73 | 1.73 |
| Surfactant A | 0.6 | 0.6 | 0.6 | 0.6 | 0.6 | 0.6 | 0.6 | 0.6 |
| Catalyst A | 0.22 | 0.22 | 0.22 | 0.22 | 0.22 | 0.22 | 0.22 | 0.22 |
| Catalyst B | 0.15 | 0.15 | 0.15 | 0.15 | 0.15 | 0.15 | 0.15 | 0.15 |
| Catalyst C | 0.03 | 0.03 | 0.03 | 0.03 | 0.05 | 0.03 | 0.03 | 0.03 |
| Polyol side total | 102.73 | 102.73 | 102.73 | 102.73 | 102.75 | 102.73 | 102.73 | 102.73 |
| Nominal index | 81 | 85 | 80 | 80 | 80 | 85 | 85 | 90 |
| Isocyanate A | 0.00 | 0.00 | 0.00 | 0.00 | 0.00 | 0.00 | 0.00 | 0.00 |
| Isocyanate C | 53.42 | 56.06 | 52.91 | 52.66 | 50.68 | 53.84 | 51.97 | 55.03 |
| Total Mass | 156.15 | 158.79 | 155.64 | 155.39 | 153.43 | 156.57 | 154.70 | 157.76 |
| 90% Compression Set | 71 | 70 | 1 | 2 | 2 | 1 | 1 | 1 |

While the foregoing is directed to embodiments of the invention, other and further embodiments of the invention may be devised without departing from the basic scope thereof.

What is claimed is:

1. A reaction system for preparation of a viscoelastic polyurethane foam comprising:
   (a) a polyisocyanate component;
   (b) an isocyanate reactive component comprising:
      (i) from 35 to 68% by weight of the isocyanate reactive component of one or more propylene oxide rich (PO-rich) polyols having a combined number average equivalent weight from 200 to 500, and a polyoxypropylene content of at least 70% by weight of the total mass of the one or more PO-rich polyols;
      (ii) from 30 to 45% by weight of the isocyanate reactive component of one or more ethylene oxide rich (EO-rich) polyols having a combined number average equivalent weight from 1,500 to 2,000, and a polyoxyethylene content of at least 70% by weight of the total mass of the one or more EO-rich polyols;
      (iii) from 2 to 10% by weight of the isocyanate reactive component of one or more butylene oxide rich (BO-rich) polyethers having a combined number average equivalent weight of 2,000 or more, and a polyoxybutylene content of at least 70% by weight of the total mass of the one or more BO-rich polyethers;
   (c) water; and
   (d) a catalyst component.

2. The reaction system of claim 1, wherein the one or more butylene oxide (BO) rich polyethers have a combined number average equivalent weight of 4,000 or more and the one or more PO-rich polyols comprise less than 65% by weight of the isocyanate reactive component.

3. The reaction system of claim 1, wherein the component (b)(ii) comprises one or more EO-rich polyols having an equivalent weight of from 500 to 1,000, and the minimum amount of said one or more EO-rich polyols having equivalent weights from 500 to 1,000, in weight % of the isocyanate reactive component, is calculated by 22.6 plus 0.0041 times the combined number average of equivalent weights of the component (b)(ii) EO-rich polyols.

4. The reaction system of claim 1, wherein the one or more PO-rich polyols comprises:
- (b)(i)(A) from 30 to 60% by weight of the isocyanate reactive component of one or more PO-rich polyols having a combined number average equivalent weight from 200 to 500; and
- (b)(i)(B) from 5 to 20% by weight of the isocyanate reactive component of one or more high equivalent weight PO-rich polyols having a combined number average equivalent weight from 800 to 2,000.

5. The reaction system of claim 1, further comprising:
- (e) an organosilicone surfactant.

6. A reaction system for preparation of a viscoelastic polyurethane foam comprising:
- (a) a polyisocyanate component;
- (b) an isocyanate reactive component comprising:
  - (i) from 35 to 58% by weight of the isocyanate reactive component of one or more propylene oxide rich (PO-rich) polyols having a combined number average equivalent weight from 200 to 500, and a polyoxypropylene content of at least 70% by weight of the total mass of the one or more PO-rich polyols;
  - (ii) from 30 to 45% by weight of the isocyanate reactive component of one or more ethylene oxide rich (EO-rich) polyols having a combined number average equivalent weight from 1,500 to 2,000, and a polyoxyethylene content of at least 70% by weight of the total mass of the one or more EO-rich polyols;
  - (iii) from 2 to 10% by weight of the isocyanate reactive component of one or more butylene oxide rich (BO-rich) polyethers having a combined number average equivalent weight of 2,000 or more, and a polyoxybutylene content of at least 70% by weight of the total mass of the one or more BO-rich polyethers;
  - (iv) from 10 to 25% by weight of the isocyanate reactive component of one or more poly(propylene oxide-co-ethylene oxide) monols, wherein the one or more poly(propylene oxide-co-ethylene oxide) monols have a combined number average equivalent weight from 400 to 600,
- (c) water; and
- (d) a catalyst component.

7. The reaction system of claim 6, wherein the isocyanate reactive component (iv) comprises one or more poly(propylene oxide-co-ethylene oxide) monols having an ethylene oxide concentration that is between 40-60% by weight of the total mass of the monol.

8. The reaction system of claim 1, wherein the polyisocyanate component (a) comprises:
- from about 0 to 10% by weight of a toluene diisocyanate (TDI) based organic polyisocyanate; and
- (ii) from about 90 to 100% by weight of a methylene diphenyl diisocyanate (MDI) based component.

9. A method of preparing a viscoelastic foam, comprising: forming reaction components, comprising:
- an organic polyisocyanate;
- an isocyanate reactive component comprising:
  - one or more propylene oxide rich (PO-rich) polyols having a polyoxypropylene content of at least 70% by weight of the total mass of the one or more PO-rich polyols and a combined number average equivalent weight from 200 to 500 at an amount from 35 to 68% by weight of the isocyanate reactive component;
  - one or more ethylene oxide rich (EO-rich) polyols having a polyoxyethylene content of at least 70% by weight of the total mass of the one or more EO-rich polyols and a combined number average equivalent weight from 1,500 to 2,000 at an amount from 30 to 45% by weight of the isocyanate reactive component,
  - one or more butylene oxide rich (BO-rich) polyethers having a polyoxybutylene content of at least 70% by weight of the total mass of the one or more BO-rich polyols and a combined number average equivalent weight of 2,000 or more at an amount from 2 to 10% by weight of the isocyanate reactive component;
- water; and
- a catalyst component; and
- combining the reaction components at conditions sufficient to form a viscoelastic polyurethane foam.

10. The method of claim 9, wherein the one or more BO-rich polyethers have a combined number average equivalent weight of 4,000 or more and the one or more PO-rich polyols comprise less than 65% of the isocyanate reactive component.

11. The method of claim 9, wherein the one or more PO-rich polyols comprises:
- (b)(i)(A) from 30 to 60% by weight of the isocyanate reactive component of one or more PO-rich polyols having a combined number average equivalent weight from 200 to 500; and
- (b)(i)(B) from 5 to 20% by weight of the isocyanate reactive component of one or more high equivalent weight PO-rich polyols having a combined number average equivalent weight from 800 to 2,000.

12. The method of claim 9, wherein the polyisocyanate component (a) comprises:
- (i) from about 0 to 10% by weight of a toluene diisocyanate (TDI) based organic polyisocyanate; and
- (ii) from about 90 to 100% by weight of a methylene diphenyl diisocyanate (MDI) based component.

13. The method of claim 9, wherein the isocyanate reactive component comprises: a polypropylene oxide-co-ethylene oxide monol at an amount from 10 to 25% by weight of the isocyanate reactive component.

14. A reaction system for preparation of a viscoelastic polyurethane foam comprising:
- (a) a polyisocyanate component;
- (b) an isocyanate reactive component comprising:
  - (i) from 35 to 68% by weight of the isocyanate reactive component of one or more propylene oxide rich (PO-rich) polyols having a combined number average equivalent weight from 200 to 500, and a polyoxypropylene content of at least 70% by weight of the total mass of the one or more PO-rich polyols;
  - (ii) from 30 to 45% by weight of the isocyanate reactive component of one or more ethylene oxide rich (EO-rich) polyols having a combined number average equivalent weight from 1,500 to 2,000, and a polyoxyethylene content of at least 70% by weight of the total mass of the one or more EO-rich polyols;
  - (iii) from 2 to 10% by weight of the isocyanate reactive component of one or more butylene oxide rich (BO-rich) polyethers having a combined number average equivalent weight of 2,000 or more, and a polyoxybutylene content of at least 70% by weight of the total mass of the one or more BO-rich polyethers;
- (c) water; and
- (d) a catalyst component.

* * * * *